Dec. 1, 1970  U. C. VON EIFF  3,544,138
COUPLING ASSEMBLY FOR CONDUITS
Filed April 7, 1969
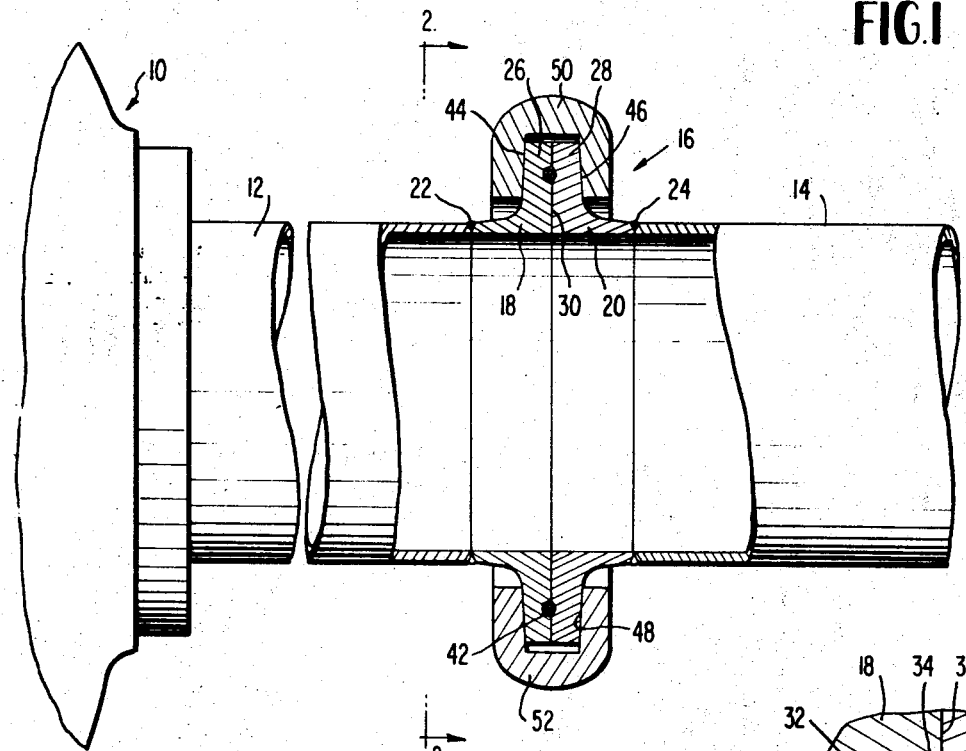
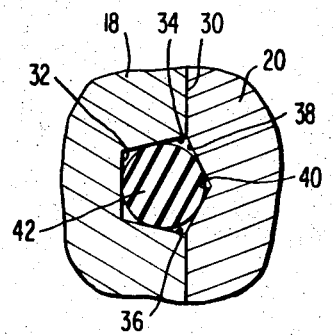
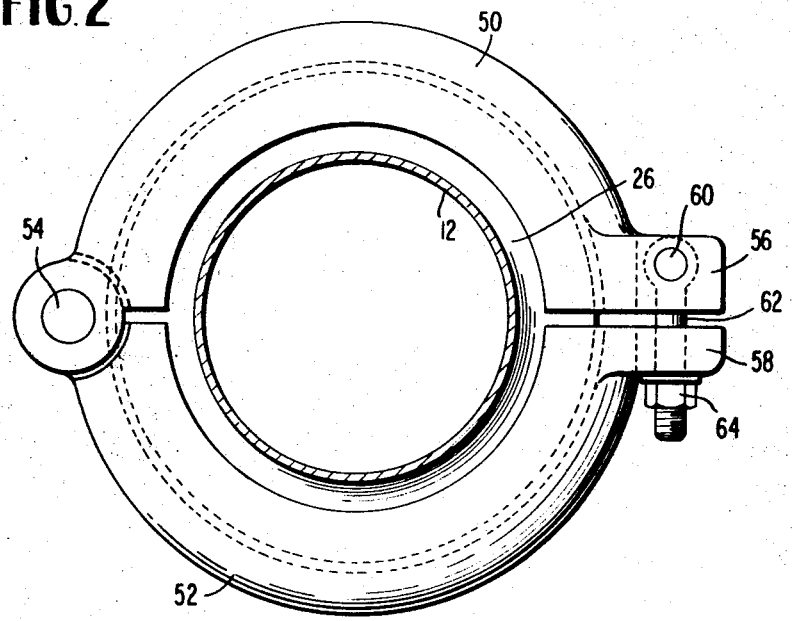
INVENTOR
ULRICH CHRISTOF VON EIFF
BY *Irmine & Smiley*
ATTORNEYS

United States Patent Office 3,544,138
Patented Dec. 1, 1970

3,544,138
COUPLING ASSEMBLY FOR CONDUITS
Ulrich C. von Eiff, Malintzin 34-B, Coyoacan,
Mexico City 21, Mexico
Filed Apr. 7, 1969, Ser. No. 814,042
Int. Cl. F16l 17/00
U.S. Cl. 285—336         2 Claims

ABSTRACT OF THE DISCLOSURE

The flat end faces of a pair of coupling members are clamped together and provided with registering grooves defining a channel of irregular pentagonal cross section within an O-ring is received. The assembly effects a seal for fluids under high pressure while allowing for ready and easy coupling and uncoupling of the members.

BACKGROUND OF THE INVENTION

Coupling of pipe or conduit sections or the coupling between any adjacent parts for conveying fluids have been effective in a variety of ways, and in many instances, have incorporated O-rings as a component part of the sealing action effected incidental to the coupling action. The inlet and outlet connections of pumps should be connected to the associated conduit system in such a fashion as not only establishes the requisite sealing action, but also allows for ready and easy coupling and uncoupling actions in order to assure that maintenance may be effected as rapidly and easily as possible. There are of course many other applications in which an effective seal and ease of connect and disconnect are important, but to my knowledge these two requirements do not normally go hand-in-hand. In fact, one is usually achieved at the expense of the other.

BRIEF SUMMARY OF THE INVENTION

Accordingly, it is of primary concern in connection with the present invention to provide an improved form of coupling assembly which not only affects a tremendously advantageous sealing action, but which is also easily and readily connected and disconnected.

Essentially, the present invention involves the utilization of grooved end faces in a pair of coupling members, which end faces are adapted to be disposed in substantially flat, face-to-face relationship and to define a channel therebetween, which channel is of irregular pentagonal cross section and which contains a resilient O-ring member contacting the grooves defining the annular chamber at the apices of the irregular pentagon defined essentially at the median points of the walls of the irregular pentagon defined by the chamber or channel.

The coupling members are provided with annular flanges defining the aforesaid end faces and the flanges are tapered along the outer sides and receive a wedging action by virtue of a sectional ring member having an annular groove of tapered formation corresponding to the taper of the flanges. The sectional clamping member is hinged together and provided with quick disconnect and connect locking means so as to minimize the effort and time required for coupling and uncoupling the assembly.

BRIEF DESCRIPTION OF THE DRAWING FIGURES

FIG. 1 is a view partly in section illustrating a coupling assembly according to the present invention at the outlet side of a pump;

FIG. 2 is a transverse section taken substantially along the plane of section line 2—2 in FIG. 1 and showing details of a clamping ring; and, FIG 3 is an enlarged cross section illustrating the sealing action effected between the irregular pentagonal channel and the O-ring.

DETAILED DESCRIPTION OF THE INVENTION

With reference more particularly to FIG. 1, the invention may be utilized in a combination of parts defining a conduit or passageway for fluids, and for purposes of illustration is shown in combination with a pump 10 having an outlet conduit 12 which is to be connected to a main conduit portion 14 of an associated system by an improved coupling assembly 16 according to the present invention. The outlet pipe 12 is provided with a coupling member 18 and the conduit 14 is also provided with a coupling member 20, the two conduits 12 and 14 being respectively joined to their coupling elements 18 and 20 as by welding 22 and 24 respectively or by any other suitable means, it being appreciated that the particular manner of forming the coupling members into the system with which the invention is associated forms, per se, no part of the present invention.

The coupling members 18 and 20 are provided with radial, annular flange portions 26 and 28 which have flat, annular end faces disposed in face-to-face contact at an interface 30. As may be seen best in FIG. 3, one of the members 18 or 20 is provided with a U-shaped annular groove defined by a bottom wall 32 disposed parallel to the interface 30 and outwardly divergent side walls 34 and 36, in which the width of the several walls 32, 34 and 36 are equal.

The other coupling member is provided with a V-shaped annular groove disposed in registering relationship with the groove in the first mentioned member, the V-groove being defined between mutually inwardly convergent side walls 38 and 40 and which in conjunction with the walls 32, 34, 36 define an irregular pentagon. A resilient O-ring member 42 is disposed within the annular chamber or channel afforded by the registering grooves of the two members 18 and 20 and the O-ring 42 contacts the walls of the grooves substantially along the median lines thereof at the apices of an irregular pentagon as shown in FIG. 3. The utilization of irregular pentagonal configuration has been found to effect a substantially greater sealing effect than other groove arrangements which have become conventional in the art. It is believed that the improved sealing effect is due to the fact that the interface 30 does not, as is usual, extend along a plane which is coincidental with the center of the O-ring 42 and positions the spaces, into which the O-ring may deflect or expand due to pressure differentials tending to cause leakage, which are asymmetrically disposed with respect to the interface 30.

As may be seen better in FIGS. 1 and 2, the outer faces of the flanges 26 and 28, as indicated by the reference characters 44 and 46, are tapered and are received within a correspondingly tapered annular groove 48 of a split ring clamp comprising two sections 50 and 52. These two sections are hingedly interconnected by a pivot 54 while their opposite ends are provided with anchoring extensions 56 and 58, one of which is provided preferably with an anchoring pin 60 securing a threaded member 62 thereto which is cooperable with the nut 64 seated against the other extension 58 to hold the split ring in clamping position.

This particular type of split or sectionalized ring clamping member allows ready and easy removal and replacement and effectively assures that the end faces of the coupling members 18 and 20 are seated in face-to-face contact which is all that is necessary to assure that the O-ring seal 42 will effectively provide a sealing action against very high internal pressures.

I claim:
1. In a conduit for handling fluids under high pressure, in combination,
   a pair of members, each having a flat end face surrounding an opening therein for conducting fluids,
   the end face of one member having a groove therein surrounding the opening, said groove being defined by a bottom wall lying parallel to its associated end face and opposite side walls extending in mutually divergent relation from said bottom wall to said associated end face,
   the end face of the other member having a second groove therein surrounding the opening in said other member, said second groove being defined by a pair of side walls converging inwardly from their associated end face to enclose an obtuse angle and intersect at a distance from their associated end face which is less than the distance between the bottom wall of the first mentioned groove and its associated end face,
   means for clamping said coupling members together with their end faces in face-to-face contact and their grooves in registry,
   and a resilient gasket of circular cross section received within said registering grooves and complementary in shape thereto so as to surround the openings in said members, said gasket being of a diameter to engage all of the walls of said grooves only substantially centrally thereof at the apices of an imaginary irregular pentagon.

2. In a conduit system as defined in claim 1 wherein the outer faces of said annular flanges are radially outwardly tapered, said means for clamping comprising a sectional ring member having a tapered annular groove receiving said annular flanges therein.

References Cited

UNITED STATES PATENTS

| | | | |
|---|---|---|---|
| 1,093,868 | 4/1914 | Leighty | 285—367 X |
| 2,131,552 | 9/1938 | De Lin | 285—349 X |
| 2,739,855 | 3/1956 | Bruning | 277—171 X |

FOREIGN PATENTS

| | | |
|---|---|---|
| 903,532 | 1/1945 | France. |
| 280,783 | 7/1962 | Netherlands. |

DAVE W. AROLA, Primary Examiner

U.S. Cl. X.R.

285—367